US010467767B2

(12) United States Patent
Syeda-Mahmood et al.

(10) Patent No.: US 10,467,767 B2
(45) Date of Patent: Nov. 5, 2019

(54) 3D SEGMENTATION RECONSTRUCTION FROM 2D SLICES

(71) Applicant: INTERNATIONAL BUSINESS MACHINES CORPORATION, Armonk, NY (US)

(72) Inventors: Tanveer Syeda-Mahmood, San Jose, CA (US); Hongzhi Wang, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 19 days.

(21) Appl. No.: 15/389,860

(22) Filed: Dec. 23, 2016

(65) Prior Publication Data
US 2018/0182103 A1 Jun. 28, 2018

(51) Int. Cl.
*G06T 7/20* (2017.01)
*G06T 7/30* (2017.01)
*G06T 7/32* (2017.01)
*G06T 7/12* (2017.01)

(52) U.S. Cl.
CPC .............. *G06T 7/30* (2017.01); *G06T 7/12* (2017.01); *G06T 7/32* (2017.01); *G06T 2207/10081* (2013.01); *G06T 2207/20096* (2013.01); *G06T 2207/20108* (2013.01); *G06T 2207/20128* (2013.01); *G06T 2207/30048* (2013.01); *G06T 2207/30101* (2013.01)

(58) Field of Classification Search
None
See application file for complete search history.

(56) References Cited

U.S. PATENT DOCUMENTS

| 6,898,303 | B2 | 5/2005 | Armato, III et al. | |
|---|---|---|---|---|
| 8,612,890 | B2 | 12/2013 | Nijlunsing et al. | |
| 8,698,795 | B2 | 4/2014 | Grewer et al. | |
| 9,251,596 | B2 | 2/2016 | Rueckert et al. | |
| 2011/0235884 | A1* | 9/2011 | Schreibmann | A61B 6/037 382/131 |
| 2012/0027271 | A1* | 2/2012 | Zankowski | G06T 7/0087 382/128 |
| 2012/0281900 | A1* | 11/2012 | Rueckert | G06K 9/468 382/131 |
| 2014/0369585 | A1* | 12/2014 | Piper | G06K 9/6207 382/131 |
| 2015/0178938 | A1* | 6/2015 | Gorman, III | G06T 7/0087 382/131 |
| 2015/0205917 | A1 | 7/2015 | Mabotuwana et al. | |

* cited by examiner

*Primary Examiner* — Sarah Le
(74) *Attorney, Agent, or Firm* — Erik Huestis; Stephen Kenny; Foley Hoag

(57) ABSTRACT

Registration-based interpolation between images slices is provided. In various embodiments, a plurality of 2D images is read. Each of the plurality of 2D images represents a slice of a 3D volume. A plurality of annotations is read for a subset of the plurality of 2D images. The annotations comprise at least one anatomical label. 2D images lacking annotations are selected from the plurality of 2D images. The at least one anatomical label is propagated from the subset of the plurality of 2D images to the selected 2D images by deformable registration.

17 Claims, 11 Drawing Sheets

3D SEGMENTATION RECONSTRUCTION FROM 2D SLICES

BACKGROUND

Embodiments of the present disclosure relate to reconstruction of 3D segmentation from 2D slices, and more specifically, to registration based interpolation between images slices.

BRIEF SUMMARY

According to embodiments of the present disclosure, methods of and computer program products for 3D segmentation reconstruction are provided. A plurality of 2D images is read. Each of the plurality of 2D images represents a slice of a 3D volume. A plurality of annotations is read for a subset of the plurality of 2D images. The annotations comprise at least one anatomical label. 2D images lacking annotations are selected from the plurality of 2D images. The at least one anatomical label is propagated from the subset of the plurality of 2D images to the selected 2D images by deformable registration.

DETAILED DESCRIPTION

Accurate ground truth generation for 3D datasets is essential in many anatomy recognition and disease understanding applications. Interpolation techniques of the present disclosure can substantially reduce the cost of manual segmentation for 3D images by only requiring a subset of 2D slices to be manually segmented, from which 3D segmentation is reconstructed through inter-slice label propagation. According to various embodiments of the present disclosure, registration-based interpolation is applied for 3D segmentation reconstruction to further speed up interpolation-based annotation. Compared to shape-based interpolation methods, the techniques described herein can deliver accurate 3D anatomical segmentation with almost 50% reduction in the number of manually labeled slices.

With the continuous growth of medical imaging datasets, it is now possible to develop medical imaging algorithms and conduct experiments with big medical imaging data. However, the arrival of big data also poses new challenges. Since both algorithm development and quantitative evaluation require annotated datasets, tools that allow rapid annotation on large scale medical imaging data are much needed.

For fast manual segmentation on 3D images, interpolation techniques may be applied such that only a subset of 2D slices are manually segmented and the 3D segmentation is reconstructed through inter-slice label propagation. In addition to speed improvement, interpolation-based manual segmentation has advantages for web-based annotation. Due to its suitability for accommodating collaborating efforts, web-based annotation is popular for large scale annotation tasks. However, transferring 3D medical images can be time consuming, especially through low band-width connections such as virtual private network (VPN). With interpolation-base annotation, data transfer delays can be reduced for 3D annotation tasks by only transferring a small portion of the data, that is a pre-selected subset of slices that need to be manually segmented. If image context information is necessary for certain manual segmentation tasks, slices near the selected slices can be transferred as well.

In comparison to shape-based and morphology-based inter-slice interpolation, image-based deformable registration is more effective for unsupervised inter-slice label propagation.

The methods herein are validated in a 3D cardiac CT anatomy annotation task as set forth further below. In the experiments, registration-based interpolation is compared with shape-based interpolation. The results show that registration-based interpolation significantly outperformed shape-based interpolation, saving about 30% slices for manual annotation than shape-based interpolation.

Figure 1:
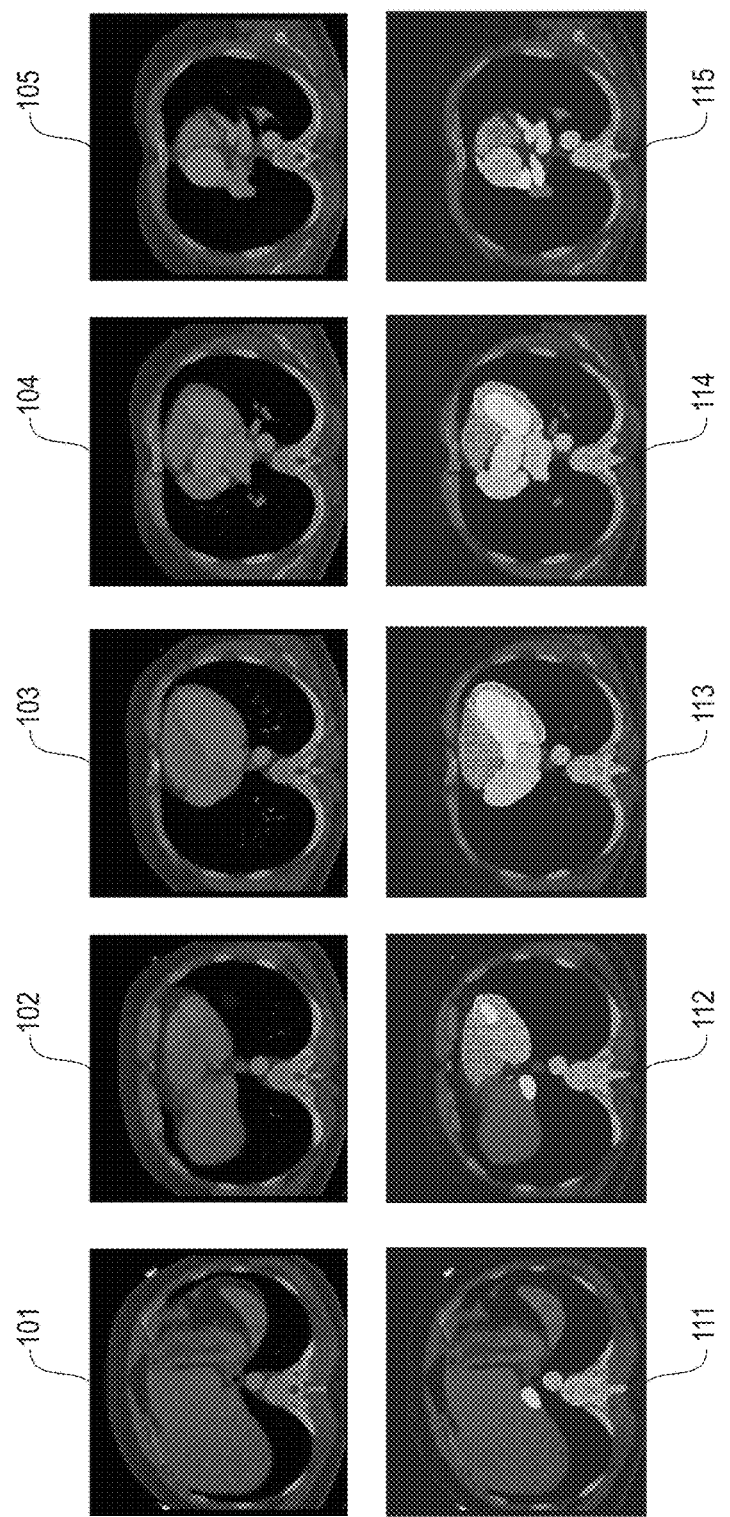
FIG. 1 depicts a plurality of exemplary images slices and manual annotations.

Referring to FIG. 1, a series of exemplary slices 101 . . . 105 of a study are depicted. Given a 3D image with n 2D slices, for fast manual annotation, only a subset of the 2D slices are selected for manual segmentation, such slices 101 . . . 105. Exemplary results of manual segmentation are depicted as labeled slices 111 . . . 115. The 3D segmentation for the entire volume is reconstructed by propagating and fusing labels from manually labeled slices such as 111 . . . 115 to the remaining unlabeled 2D slices. The present disclosure enables reduction in the number of slices for manual segmentation while preserving accuracy in the reconstructed 3D segmentation. In other words, when a fixed number of slices is selected for manual segmentation, the present disclosure minimizes errors in the reconstructed 3D segmentation.

Figure 2:
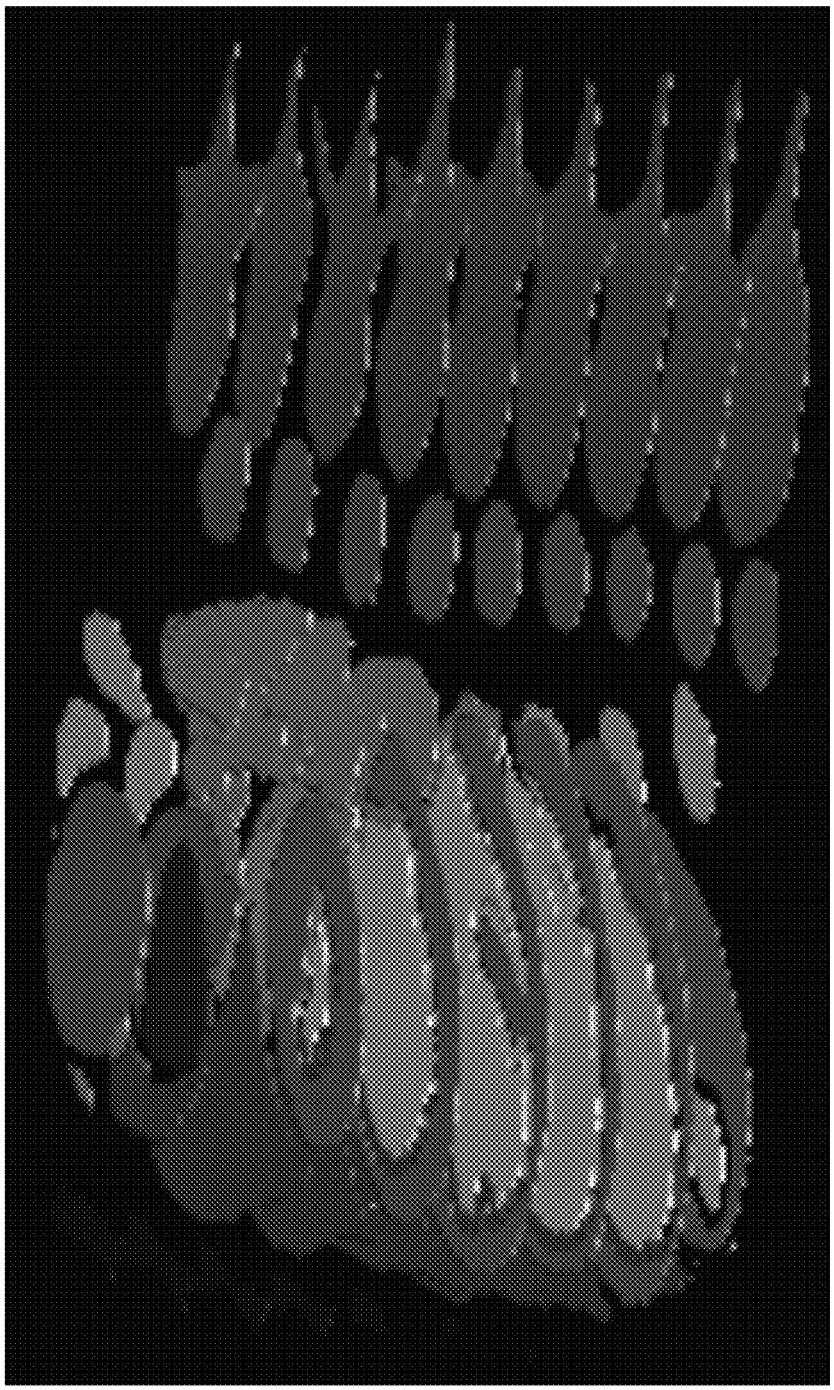
FIG. 2 depicts an exemplary set of 2D slices of a 3D volume.
Figure 3:
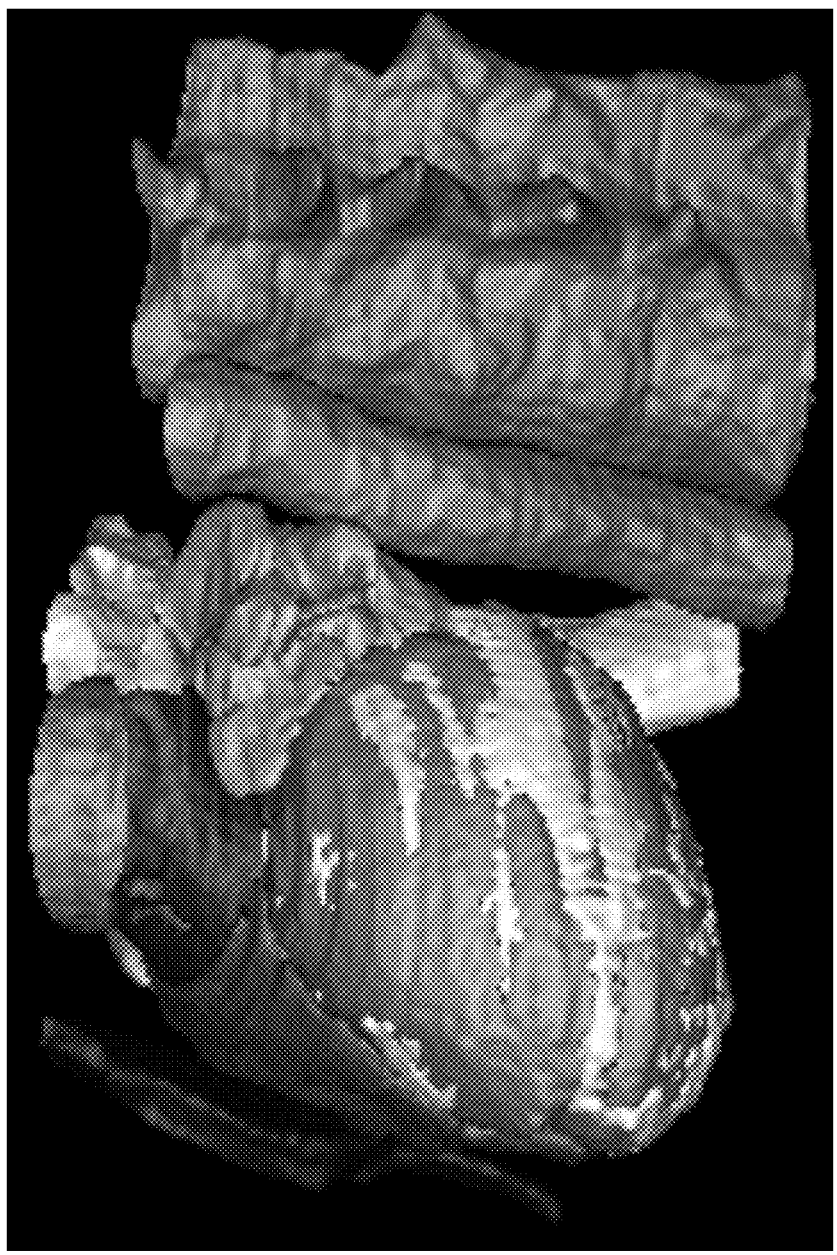
FIG. 3 depicts an exemplary reconstructed 3D segmentation according to embodiments of the present disclosure.

Referring to FIG. 2, a series of exemplary slices are depicted in a stacked configuration to illustrate the 3D volume. In FIG. 3, an exemplary reconstructed volume is depicted based on the exemplary slices of FIG. 2.

According to various embodiments, registration-based interpolation is applied for inter-slice label propagation. To this end, deformable registration is computed between adjacent slices. Deformable registration between non-adjacent slices is calculated by composing deformation fields of adjacent slices located between them. Let $\phi_{i \rightarrow i+1}$ be the diffeomorphic map from slice i to slice i+1. Then, $\phi_{i \rightarrow j} = \phi_{i \rightarrow i+1} \circ \ldots \circ \phi_{j-1 \rightarrow j}$ for any j>i. Comparing to directly estimating pairwise registration between any slice pairs, the composition-based approach is more efficient because O(n) registrations are needed as opposed to $O(n^2)$. Furthermore, deformation composition avoids more difficult problems of estimating large deformations between far apart slices.

Since the anatomical similarity between two slices usually decreases as the inter-slice distance increases, it is expected that label propagation error also increases as inter-slice distance increases. Hence, given a set of manually segmented slices S, for an unlabeled slice i, at most two annotated slices from S, i.e., $\text{argmax}_{j<i, j\in S}$ and $\text{argmin}_{j>i, j\in S}$, will be applied to segment slice i.

For slices that have labels propagated from two manually labeled slices, a patch-based label fusion approach is applied to fuse the labels. For each patch of size 7×7 in a target slice, the two corresponding patches from the warped slices are fused by locally weighted voting, where the voting weights are computed by using the joint label fusion algorithm.

Figure 4:
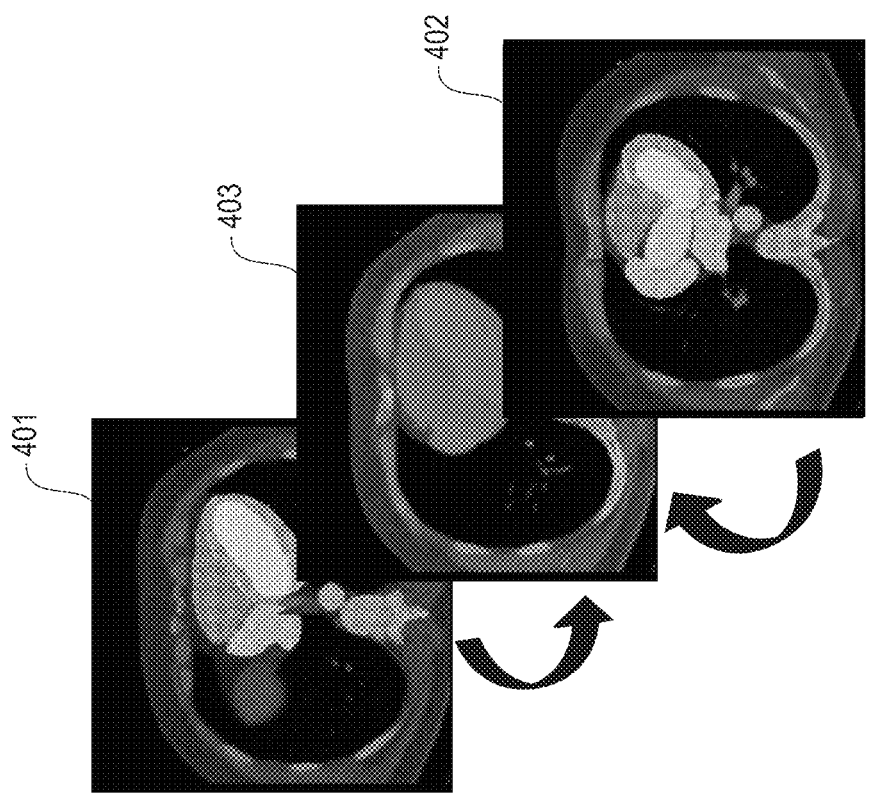
FIG. 4 illustrates an exemplary process of label propagation and fusion according to embodiments of the present disclosure.

Referring to FIG. 4, deformable registration and label propagation is illustrated. First slice 401 and second slice 402 are manually labeled. Deformable registration is applied to propagate labels to intermediate slice 403, allowing 3D segmentation reconstruction. As illustrated, two way registration is applied, and then the labels are propagated to intermediate slice 403, followed by label fusion.

Various deformable registration methods are suitable for according to the present disclosure. For example, image-based registration may be computed using the Advanced Normalization Tools (ANTs) software. Such registration sequentially optimizes an affine transform and a deformable transform (Syn) between a pair of images, using the Mattes mutual information metric. In a multi-atlas case, image similarity based local weighted voting may be applied for combining the candidate segmentations produced by different atlases for the same target image. The voting weights may be computed using the joint label fusion technique. Joint label fusion as provided by ANTs may be applied.

In other embodiments, optical flow based registration is applied instead. In general, optical flow based registration requires a larger number of manually annotated slices, but is faster than the above outlined methods. In optical flow based approaches, a vector field is computed indicating the movement of a pixel from image to image. In sparse approaches, the vector field is limited to pixels of interest, as extracted in a preprocessing step by, e.g., Shi-Tomashi or Harris algorithms. Based on the vector field, intermediate labels may be computed.

Registration based methods according to embodiments of the present disclosure preserve fine structure that may be lost when applying a naïve interpolation proves, particularly where slices are too far apart. Accordingly, the present disclosure requires fewer manually segmented slices for accurate 3D reconstruction.

Figure 5:
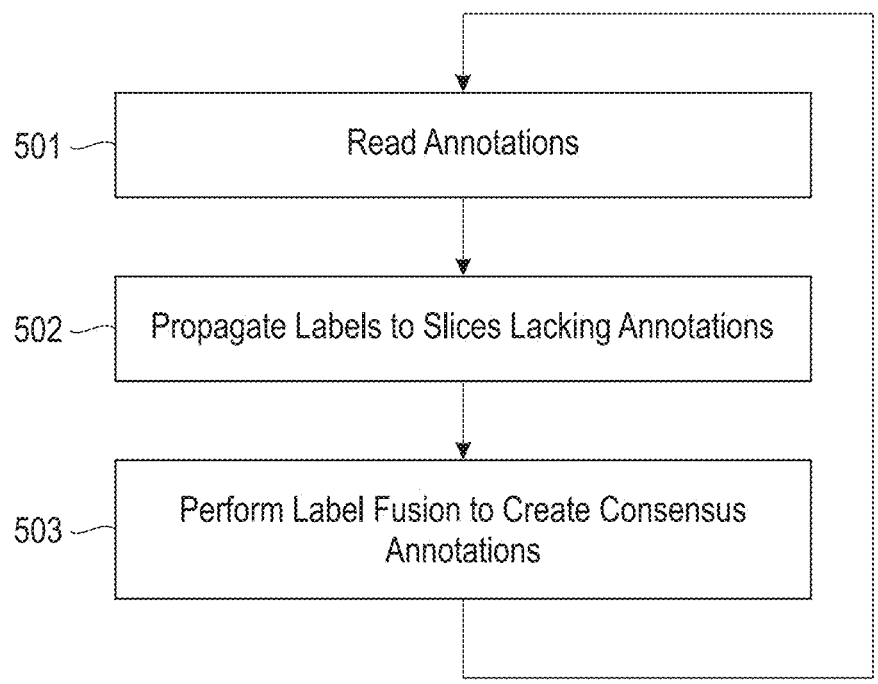
FIG. 5 illustrates an exemplary method for 3D segmentation reconstruction according to embodiments of the present disclosure.

Referring to FIG. 5, an exemplary method for 3D segment reconstruction according to embodiments of the present disclosure is illustrated. An image study comprises a plurality of 2D slices that together describe a 3D volume. At 501, annotations are read for a subset of the 2D slices. The annotations include anatomical labeling of at least one anatomical feature. These annotations may be manual, or may be the result of various automatic annotation processes. For a 2D slice lacking annotations, at 502, anatomical labels are propagated to it from at least one neighbor. In some embodiments, neighboring slices from either side of the slice are used. Where labels are prorogated form multiple slices, joint label fusion is applied at 503 to fuse the two propagated annotations into a consensus annotation. The process may be repeated, iterating over all slices lacking annotations. Anatomical labels are propagated between any two slices through calculating deformable image registration between the two slices. In some embodiments, deformable registration between adjacent 2D slices is calculated using ANTs registration. In other embodiments, deformable registration is calculated by optical flow. In some embodiments, deformable registration between non-adjacent 2D slices is produced by composing registrations produced for adjacent slices located between the two non-adjacent slices. Accordingly, fewer manually segmented slices are required for accurate 3D reconstruction than in alternative interpolation schemes.

Experimental Results

To validate exemplary embodiments of the present disclosure, slice selection methods according to the concurrently filed commonly owned U.S. application entitled "SLICE SELECTION FOR INTERPOLATION-BASED 3D MANUAL SEGMENTATION," which is hereby incorporated by reference, and registration-based interpolation methods according to the present disclosure are applied to sample images as set forth below.

Cardiac CT studies were axially acquired by a Siemens CT Scanner (Somatom Definition Flash; Siemens Healthcare, Erlangen, Germany). Each image has isotropic in-plane resolutions, varying from 0.55 $mm^2$ to 0.80 $mm^2$. The slice thickness varies from 0.8 mm to 2.0 mm. A histogram equalization was applied to each image to enhance the intensity contrast between different structures. The histogram equalized images were then resampled to have a 1 $mm^3$ isotropic resolution.

For validation purpose, a set of 16 anatomical structures were manually traced by a clinician using Amira 5.5.0, for 28 cases. The labeled structures include sternum, aorta (ascending/descending/arch/root), pulmonary artery (left/right/trunk), vertebrae, left/right atrium, left/right ventricle, left ventricular myocardium, and superior/inferior vena cava. Intra-rater and inter-rater accuracy was measured in Dice similarity coefficient (DSC) over the 16 structures on 5 randomly selected cases, which is 0.861±0.097 and 0:828±0:071, respectively.

The symmetric normalization (SyN) algorithm was applied as implemented in Advanced Normalization Tools (ANTs) with the cross-correlation similarity metric for deformable registration. Three resolution optimization was applied with maximum 20, 10, and 5 iterations at the coarse, middle and fine levels, respectively.

To obtain a complete profile on how effective slice selection and registration-based interpolation methods are, the slice selection method is applied to select various number of slices from each testing image. The interpolation ratio is defined to be the ratio of total number of slices over the number of selected slices. The interpolation ratio was varied between 3 and 20 for each image. For evaluation, DSC was calculated between each reconstructed 3D segmentation and the respective original manual segmentation.

Registration-based interpolation is compared with shape-based interpolation. To implement shape-based interpolation, a distance map was calculated for each anatomical structure for each selected slice using manual segmentation. The distance maps for an unlabeled slice was produced by linearly interpolating the distance maps from respective propagating slices. The reconstructed segmentation was then derived from voting on its distance maps.

The present slice selection methods are compared with a uniform slice selection scheme. In this uniform selection method, the selected slices are evenly distributed in space among the entire set of slices. If K slices are selected for a 3D volume with n slices, the index of the $k_{th}$ selected slice is $$\left\lfloor \frac{nk}{K+1} + 0.5 \right\rfloor.$$

To investigate the full potential of these slice selection methods, it was also applied using ground truth label propagation errors, where the ground truth inter-slice propagation error was generated by Equation 1Equation 1 using manual segmentations. The 3D segmentation reconstruction accuracy produced by slices selected from ground truth M provides a upper bound performance for the methods herein.

$$E_{j \to i} = \sum_{x} I(L_{j \to i}(x) \neq L_i(x)) \qquad \text{Equation 1}$$

Figure 6:
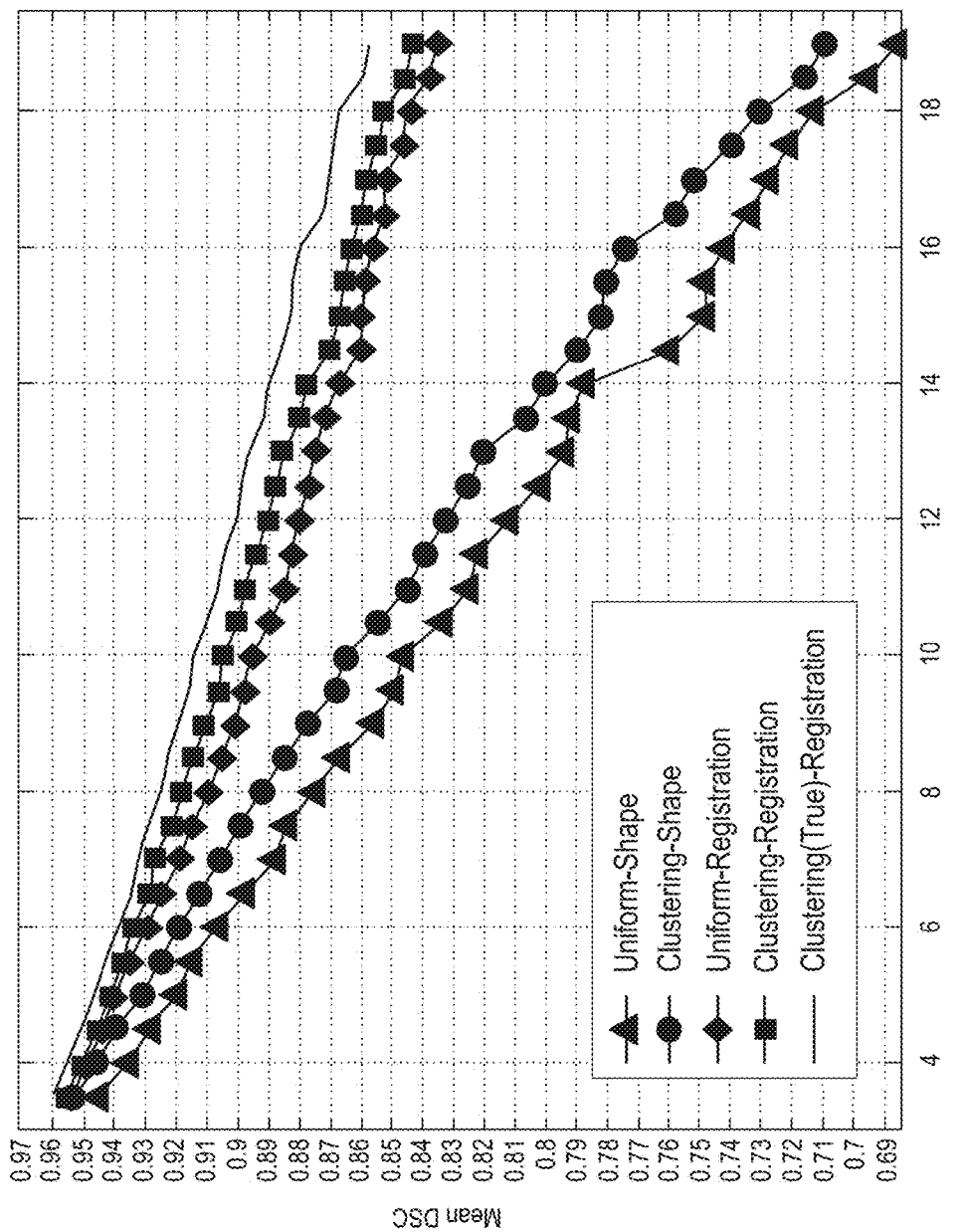
FIG. 6 illustrates observed 3D reconstruction accuracy according to an embodiment of the present disclosure.

FIG. 6 shows the 3D reconstruction accuracy (averaged over all subjects and over all anatomical structures) produced by using different slice selection methods, different interpolation methods and different interpolation ratios. Registration-based interpolation prominently outperformed shape-based interpolation. The advantage of registration-based interpolation is more substantial for long range interpolation tasks, i.e., larger interpolation ratios.

Clustering-based slice selection methods consistently outperformed uniform slice selection. The improvements by registration-based interpolation and by adaptive slice selection are both statistically significant for all interpolation ratios, with p<0:02 on the paired t-test. Although the intensity-based inter-slice propagation error model was empirically fitted on a different dataset, using the model our method approximately reduces the performance gap between uniform selection and the upper bound of our method by half. The performance gap between adaptive slice selection and the upper bound performance increases as interpolation ratio increases. This result indicates that the intensity-based propagation error model is less accurate for slices too far away from each other.

Figure 7A:
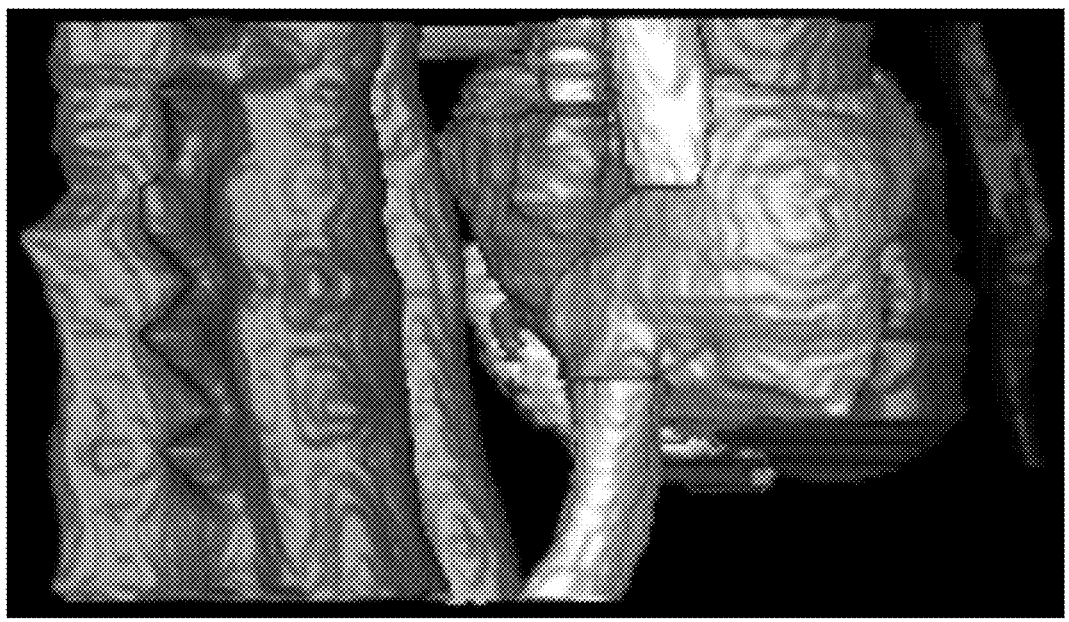
FIGS. 7A-D show exemplary registration-based 3D reconstructions according to various embodiments of the present disclosure.
Figure 7B:
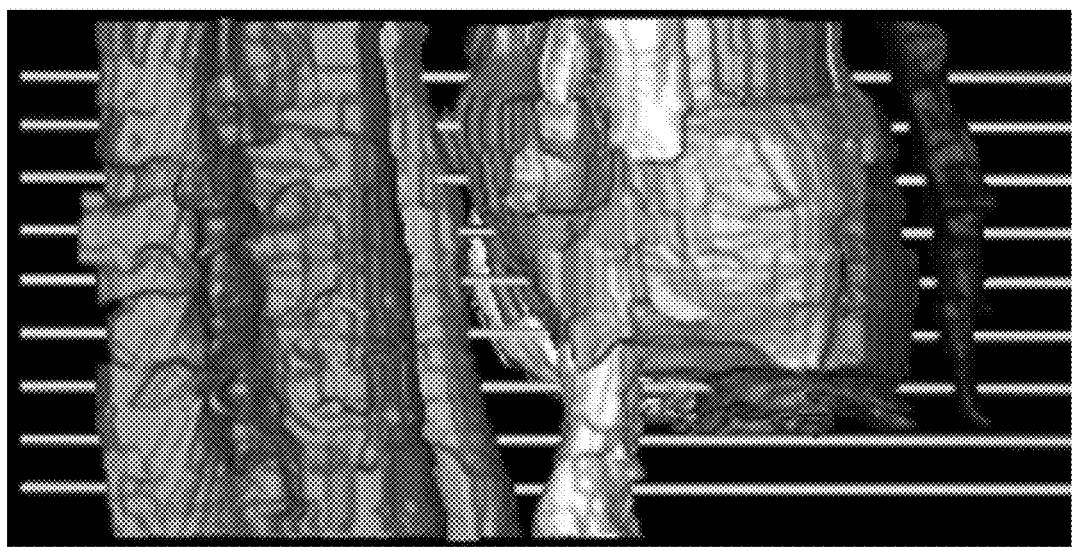
Figure 7C:
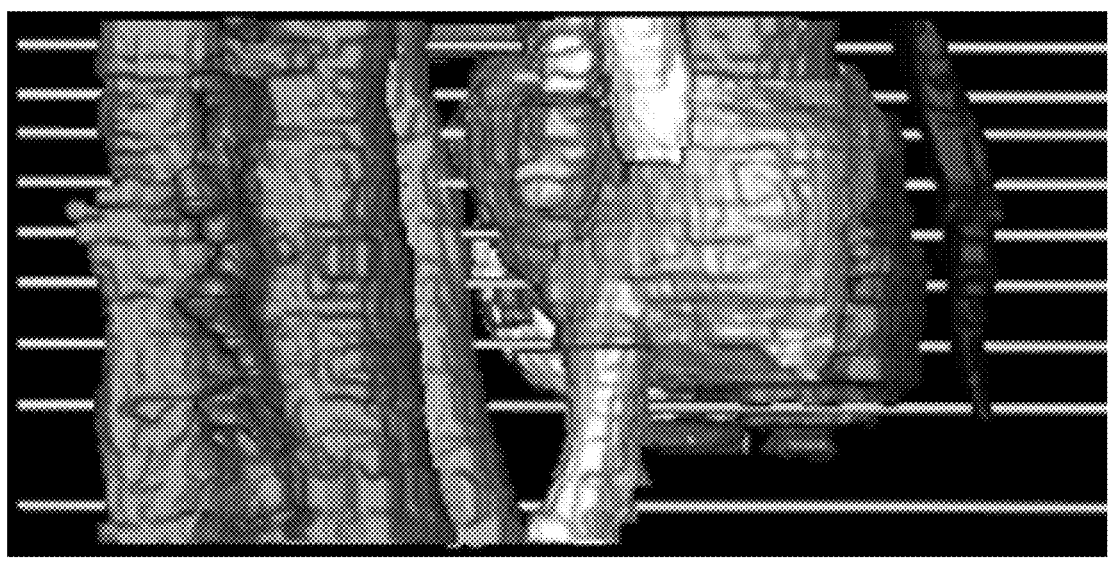
Figure 7D:
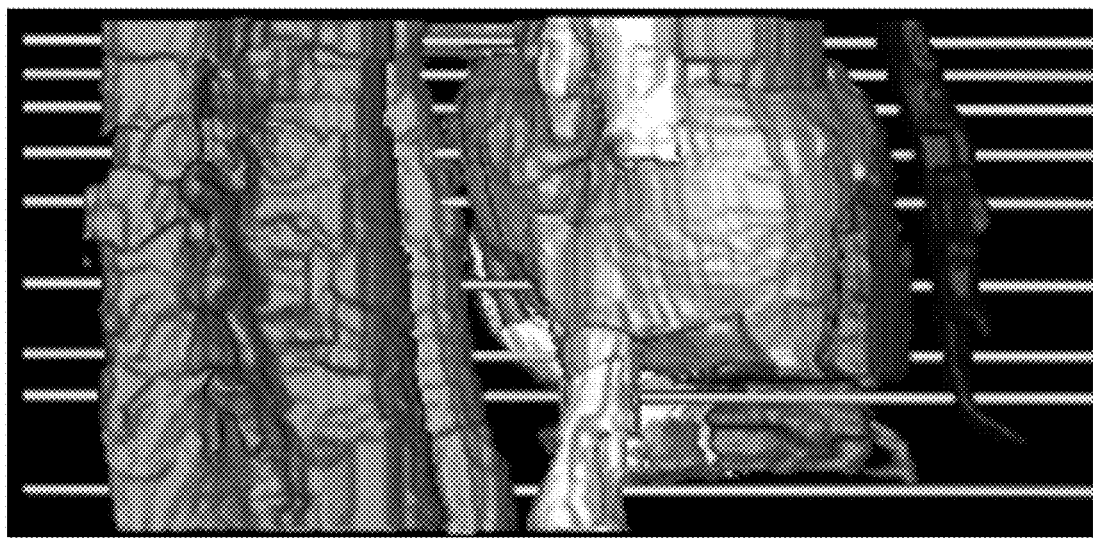

FIGS. 7A-D show examples of registration-based 3D reconstruction from manually segmented axial slices selected by uniform slice selection (FIG. 7B), clustering-based selection (FIG. 7C), and clustering with true inter-slice propagation errors (FIG. 7D). The horizontal lines show the slices selected by each method. The interpolation ratio for this example is 15.

Overall, registration-interpolation saves about 30-40% slices for manual segmentation than shape-based interpolation. Adaptive slice selection further reduces about 10% slices comparing to uniform selection. For example, when shape-based interpolation is applied, average reconstruction accuracy using slices chosen by uniform selection and our slice selection method reaches the intra-rater accuracy level, i.e., 0.86 average DSC, when the interpolation ratios are 9 and 10, respectively. When registration-based interpolation was applied, the interpolation ratios for the two slice selection methods to reach the intra-rater accuracy level are 15 and 16.5, respectively.

Figure 8:
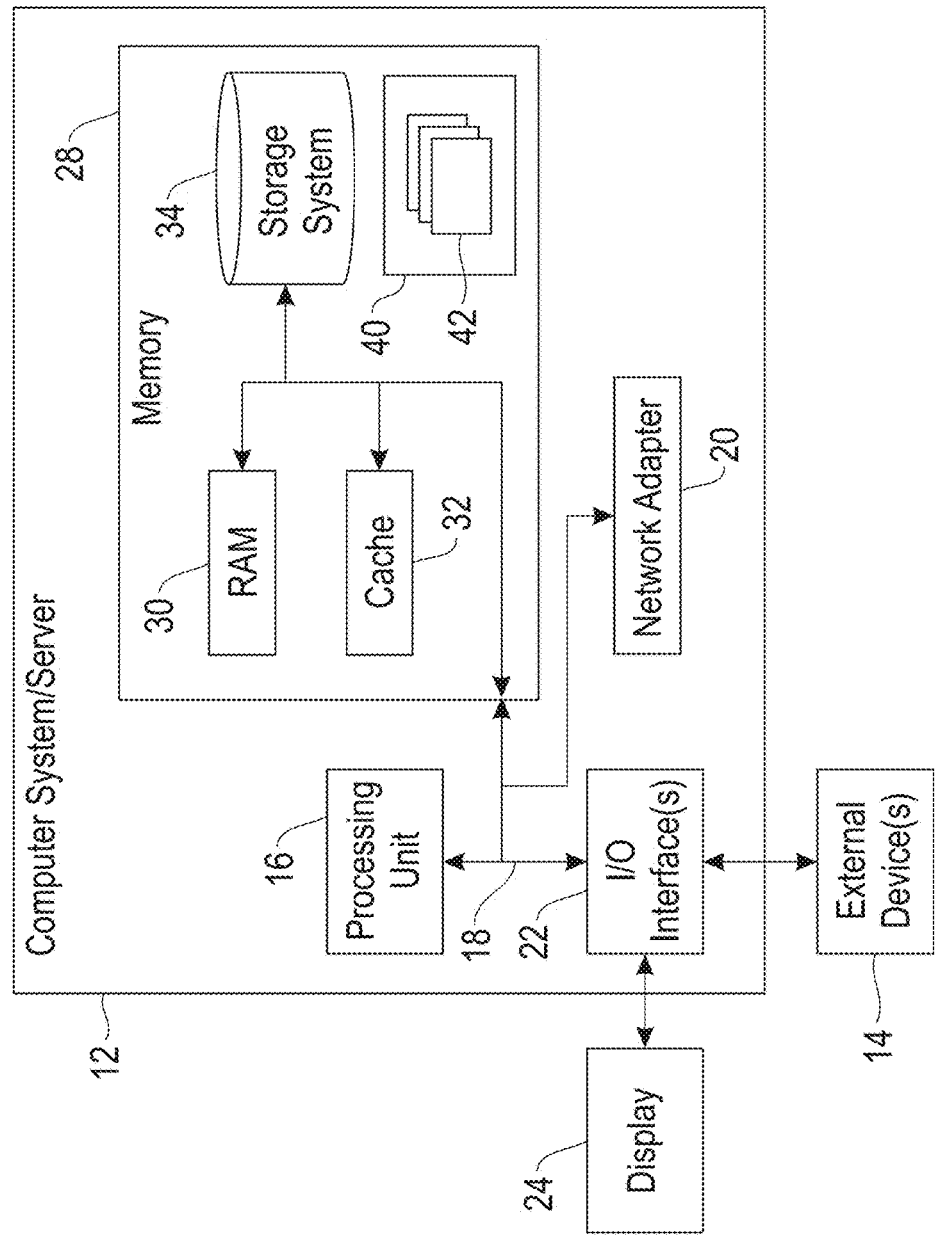
FIG. 8 depicts a computing node according to an embodiment of the present invention.

Referring now to FIG. 8, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    reading a plurality of 2D images of a study, each of the plurality of 2D images representing a slice of a 3D volume;
    reading a plurality of annotations for a subset of the plurality of 2D images, the annotations comprising at least one anatomical label;
    selecting 2D images lacking annotations from the plurality of 2D images;
    propagating the at least one anatomical label from the subset of the plurality of 2D images to the selected 2D images by deformable registration among adjacent slices within the 3D volume, wherein propagating the at least one anatomical label comprises:
        applying deformable registration between each of the subset of the plurality of 2D images and one of the selected images to determine a plurality of propagated annotations; and
        determining a consensus annotation by label fusion using the annotations from at least two of the plurality of 2D images.

2. The method of claim 1, further comprising:
    constructing a 3D segmentation based on the plurality of annotations and the at least one propagated label.

3. The method of claim 1, wherein the deformable registration comprises optical flow registration.

4. The method of claim 1, wherein propagating the at least one anatomical label comprises iterating over the selected images.

5. The method of claim 1, wherein the subset comprises images adjacent to the selected 2D image.

6. The method of claim 1, wherein propagating the at least one anatomical label comprises:
    registering non-adjacent images of the plurality of 2D images by composing registrations between adjacent images.

7. The method of claim 1, wherein label fusion comprises similarity based local weighted voting.

8. A computer program product for 3D segmentation reconstruction, the computer program product comprising a computer readable storage medium having program instructions embodied therewith, the program instructions executable by a processor to cause the processor to perform a method comprising:
    reading a plurality of 2D images of a study, each of the plurality of 2D images representing a slice of a 3D volume;
    reading a plurality of annotations for a subset of the plurality of 2D images, the annotations comprising at least one anatomical label;
    selecting a plurality of 2D images lacking annotations;
    propagating the at least one anatomical label from the subset of the plurality of 2D images to the selected 2D images by deformable registration among adjacent slices within the 3D volume, wherein propagating the at least one anatomical label comprises:
        applying deformable registration between each of the subset of the plurality of 2D images and one of the selected images to determine a plurality of propagated annotations; and
        determining a consensus annotation by label fusion using the annotations from at least two of the plurality of 2D images.

9. The computer program product of claim 8, the method further comprising:
    constructing a 3D segmentation based on the plurality of annotations and the at least one propagated label.

10. The computer program product of claim 8, wherein the deformable registration comprises optical flow registration.

11. The computer program product of claim 8, wherein propagating the at least one anatomical label comprises iterating over the selected images.

12. The computer program product of claim 8, wherein the subset comprises images adjacent to the selected 2D image.

13. The computer program product of claim 8, wherein propagating the at least one anatomical label comprises:
    registering non-adjacent images of the plurality of 2D images by composing registrations between adjacent images.

14. The computer program product of claim 8, wherein label fusion comprises similarity based local weighted voting.

15. A system comprising:
    a first datastore comprising a plurality of 2D images, each of the plurality of 2D images representing a slice of a 3D volume;
    a second datastore comprising annotations corresponding to the plurality of 2D images;
    a computing node comprising a computer readable storage medium having program instructions embodied therewith, the program instructions executable by a processor of the computing node to cause the processor to perform a method comprising:
        reading the plurality of 2D images of a study from the first datastore;
        reading a plurality of annotations for a subset of the plurality of 2D images from the second datastore, the annotations comprising at least one anatomical label;

selecting a plurality of 2D images lacking annotations;
propagating the at least one anatomical label from the subset of the plurality of 2D images to the selected 2D images by deformable registration among adjacent slices within the 3D volume, wherein propagating the at least one anatomical label comprises:
applying deformable registration between each of the subset of the plurality of 2D images and one of the selected images to determine a plurality of propagated annotations; and
determining a consensus annotation by label fusion using the annotations from at least two of the plurality of 2D images.

16. The system of claim 15, the method further comprising:
constructing a 3D segmentation based on the plurality of annotations and the at least one propagated label.

17. The system of claim 15, wherein the deformable registration comprises optical flow registration.

* * * * *